3,314,958
QUATERNARY AMMONIUM ENOLATES OF
UREA DERIVATIVES
Reginald L. Wakeman, Philadelphia, Pa., and Joseph F.
Coates, Washington, D.C., assignors, by mesne assignments, to Millmaster Onyx Corporation, New York,
N.Y., a corporation of New York
No Drawing. Filed June 29, 1964, Ser. No. 378,992
7 Claims. (Cl. 260—258)

The object of the present invention is the preparation of microbiologically active compounds by reaction of certain quaternary ammonium hydroxides or salts with the enolic form of the cyclic derivatives of urea or thiourea known as ureides and purines.

The products of this invention conform, in general, with the following structure:

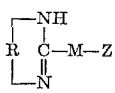

wherein Z is the cation of a microbiologically active quaternary ammonium compound, M is oxygen or sulfur and R is the residue of a di-carboxylic or a hydroxy-carboxylic acid or an aldo- or keto-carboxylic acid or a derivative thereof.

Typical of these cyclic urea derivatives are parabanic acid, barbituric acid, diethylbarbituric and ethylphenyl-barbituric as well as other substituted barbituric acids, dialuric acid, uric acid, alloxan, acetylacetoneurea, uracil, thiouracil, xanthine, hydantoin and the like.

Typical examples of the quaternary ammonium compounds which may be used in this invention are the alkyl trimethyl ammonium chlorides, alkyl-benzyl trimethyl ammonium chlorides, alkyl dimethyl benzyl ammonium chlorides, alkyl dimethyl menaphthyl ammonium chlorides, alkyl dimethyl substituted-benzyl ammonium chlorides in which the benzyl radical is substituted with one or more side chains containing from 1 to 5 carbon atoms such, for example, as methyl, dimethyl, ethyl and the like and in which the carbon atoms may all be in the same or different side chains or in which the benzyl radical bears one, two or more halogen atoms such as chlorine or bromine, alkyl pyridinium chlorides, alkyl isoquinolinium chlorides and bromides, alkyl lower-alkyl pyrrolidinium chlorides, alkyl lower-alkyl morpholinium chlorides in all of which the alkyl group may have from 8 to 22 carbon atoms and the lower-alkyl group may have from 1 to 4 carbon atoms and alkyl phenoxy ethoxy ethyl dimethyl benzyl ammonium chloride in which the alkyl radical may be iso-octyl or nonyl and in which the phenyl radical may, if desired, be substituted by a methyl radical. Various other analogs of these quaternaries may also be employed such, for example, as cetyl dimethyl ethyl ammonium bromide or oleyl dimethyl ethyl ammonium bromide.

In general, the quaternary ammonium compounds useful in this invention are the higher alkyl quaternary ammonium hydroxides, halides (chlorides and bromides), sulfates, methosulfates and the like possessing the following formula:

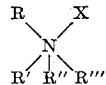

where R is an alkyl or alkaralkyl radical containing from 8 to 22 carbon atoms or an alkyl phenoxy ethoxy ethyl radical in which R is an alkyl radical containing from 8 to 9 carbon atoms and in which the phenyl radical may be substituted by a methyl group; R' and R" are methyl or ethyl radicals or members of a heterocyclic ring system such as pyridine, isoquinoline, pyrrolidine and morpholine; R''' is a methyl radical or a benzyl group or a substituted-benzyl group such, for example, as a monochlorobenzyl radical or a dichlorobenzyl radical or mixture thereof or a methyl benzyl, dimethyl benzyl, ethyl benzyl, diethyl benzyl, isopropyl benzyl, tertiary butyl benzyl or another benzyl radical containing from 1 to 5 carbon atoms as side chains, either as a single side chain or a multiplicity of side chains including mixtures thereof or a menaphthyl group or hydrogenated menaphthyl group. When R' and R" are members of a morpholine or pyrrolidine ring, R''' is a methyl, ethyl, propyl or butyl group. When R' and R" are members of an unsaturated heterocyclic ring such as pyridine or isoquinoline, R''' is the same radical as R". X in the above formula corresponds to a halide radical such as chloride, bromide or iodide or to any other water-soluble anion such as methosulfate.

In general, we prefer to use such quaternary ammonium compounds which have a phenol coefficient of at least 100 with respect to both *Staphylococcus aureus* and *Salmonella typhosa* at 20° C. when determined by the standard method given in the "Official Methods of Analysis of the Association of Official Agricultural Chemists," Ninth Edition (1960), page 63 et seq.

The compounds of this invention may be prepared by mixing aqueous solutions of the quaternary ammonium hydroxides or salts with an aqueous solution of the ureide or purine on question or any of its water-soluble salts.

After thorough mixing, the organic product layer is separated from the aqueous layer (as with a separatory funnel) since two distinct phases are formed. Separation may be facilitated by the addition of an organic solvent immiscible with water. The product layer may be washed with water to remove any residual by-product salt or unreacted materials. The solvent, if any, may be evaporated and the product air or vacuum dried to a paste, wax, oil or solid.

It is not necessary to use an aqueous medium. Any solvent or solvent mixture in which the starting materials are soluble will be satisfactory. Non-aqueous solvents facilitate the separation of by-product inorganic salt and reduce the need for vacuum drying to get an anhydrous product. When a non-aqueous medium is employed, it is usually necessary to add a small amount of water to facilitate ionic reaction.

The product may be used, if desired, without drying since any entrapped water is irrelevant to the microbiological activity of the compounds. In other applications, removal of water may be essential for reasons not related to biological activity.

An alternative method for the preparation of compounds especially applicable to the treatment of fabric, ropes, net, woven and non-woven fabric and reticulated or convoluted materials involves a two-step process. In the first step, the material is passed through a bath containing the anionic moiety. Excess solution is removed by methods well known to those skilled in the art. The treated material is then passed through a second bath wherein the concentration of quaternary ammonium compound is such that the material pickup will result in an equivalent amount of quaternary ammonium compound reacting with the anionic moiety, depositing the product in the most intimate way on the surface and in the interstices, convolutions and reticulations of the material.

The method of adjustment of solution concentration to achieve the required pickup is well known to those skilled in the art. The order of treatment may be reversed without affecting the biological activity or durability of the product on the material. The products of this invention may be formulated as water dispersions by dissolving them in a water miscible organic solvent such as acetone or methanol and diluting with water or by dissolving them in emulsifiable oils such, for example, as sulfonated castor oil or pine oil and diluting with water. In preparing aqueous dispersions, emulsifying agents such, for example, as ethylene oxide condensates of alkyl phenols may be used with or without organic solvents.

It is surprising that the compounds of this invention exhibit high microbiological activity despite their relative insolubility in water. Because of their unusual combination of physical and microbiological properties, they can be used to impart laundry-resistant anti-microbial characteristics to textiles. They can also be used as the active agent in antimildew finishes for textiles which are resistant to leaching with water.

Although the compounds have low water solubility, they are compatible with various organic solvents, plasticizers and high molecular weight compounds. Consequently, they may be incorporated as anti-microbial agents in synthetic resins and plastics. The compounds are compatible with natural and synthetic rubber latices. Therefore, they may be used to prepare bacteriostatic films and molded objects deposited from such latices.

The compounds can be incorporated into cutting and grinding fluids without precipitation. Also, they blend well with non-ionic and anionic surface active agents. In such compositions they retain their microbiological activity.

It will be understood that the properties of the products described herein will vary depending upon the nature of the cationic quaternary ammonium compound used in their preparation as well as the anionic compound reacted therewith.

The chemical, physical and biological properties of the products of our invention make them especially appropriate for the following applications when suitably incorporated in active amounts in an appropriate vehicle, binder, medium or substrate:

(1) Mildewproofing fabric, canvas, ropes, textiles, awnings, sails, tenting and other woven and non-woven reticulated materials.
(2) Paint mildewstats.
(3) Jet plane fuel additive to control growth of microorganisms.
(4) Odor preservative agents for clothes and shoes.
(5) Mildew retardant and odor suppressant for shoes and other leather products.
(6) Topical antiseptics.
(7) Antidandruff agents.
(8) Disinfection agents for hair and gut of man and beast.
(9) Bacteriostatic furniture dressing.
(10) Surface finishes for stone, plaster, tile, cement, brick and other inorganic building materials to retard growth of microorganisms, fungi, mold and algae.
(11) Wool preservative.
(12) Plant and tree spray to combat fungi.
(13) Antimycotic agents for soap wrappers.
(14) Self-sanitizing brushes.
(15) Mildewproofing agent in and on plastic and film.
(16) Mildewproofing of cellulosics, cardboard, fibreboard, paper and cordage.
(17) Contact biostat for application to film, waxes and cloth to preserve cheese, meats and vegetables and other food products.
(18) Algal inhibition, especially on surfaces and in solution where low foaming is desirable.
(19) Paper pulp slime control.
(20) Sanitizing agent for rug, carpet, curtains.
(21) Egg preservation.
(22) Adhesive preservation.
(23) Preservation of latex paints.
(24) Preservation of metal-working compounds.
(25) Additives for soap and for both anionic and nonionic detergents in liquid, bar, powder, bead, solution and other forms to impart bacteriostatic and fungistatic properties thereto.
(26) Bacteriostatic agents for household laundry softeners.
(27) Algastat and bacteriostat in recirculated water for cooling towers, air conditioners and humidifiers.
(28) Bacteriostat and algastat for flood waters and brines used in secondary oil recovery.
(29) Fungistat for seed and soil treatment against damping-off.

The microbiological activity of our compounds has been evaluated for microbiological stasis by the Standard Tube Dilution Test, the technique for which is common knowledge to those skilled in the art. A Difco Bacto CSMA Broth #0826 was used in the study. This test is used to determine the lowest concentration of microbiologically active compounds which will inhibit the growth of the organism in question. For a wide range of applications, the inhibition of growth rather than outright kill is satisfactory.

Briefly put, the Tube Dilution Test consists in placing 9 cc. of the CSMA Broth in a test tube which is then sterilized in an autoclave. One cc. of a solution of the microbiologically active compound at an appropriate concentration is added to the test tube which is then inoculated with 0.1 cc. of a twenty-four hour old culture of the organism under study. The test tube is then incubated at 37° C. for forty-eight hours and observed for bacterial growth.

The same procedure is followed for fungi. In such tests, however, the tubes are incubated for fourteen days at a temperature suitable for optimum fungal growth, usually 25° C.

This invention is illustrated by, but not restricted to, the following examples:

*Example I*

An aqueous stock solution of the sodium salt of phenobarbital (5 ethyl-5 phenylbarbituric acid) was prepared. An aliquot of this solution containing 0.0235 molecular weights of the compounnd was agitated vigorously while adding a chemically equivalent amount of a 10% solution of a commercial grade of alkyl dimethyl ethyl-benzyl ammonium chloride (Onyx Chemical Corporation's "BTC-471" in which the alkyl distribution is 50% $C_{12}$, 30% $C_{14}$, 17% $C_{16}$, 3% $C_{18}$). Benzene was added to facilitate separation into two phases and the mixture was transferred to a separatory funnel. The organic product layer was removed and vacuum dried. The product, alkyl dimethyl ethyl-benzyl ammonium 5 ethyl-5 phenylbarbiturate, was recovered as a yellow syrup in 93% of the theoretical yield.

*Example II*

An aliquot of the stock solution of phenobarbital sodium of Example I containing 0.0235 molecular weights of the compound was reacted in a similar manner with a chemically equivalent amount of a 10% solution of a commercial grade of alkyl dimethyl benzyl ammonium chloride (Onyx Chemical Corporation's "BTC-824" in which the alkyl distribution is 60% $C_{14}$, 30% $C_{16}$, 5% $C_{12}$, 5% $C_{18}$). The product, alkyl dimethyl benzyl ammonium 5 ethyl-5 phenylbibiturate, was recovered in substantially the theoretical yield as a yellow paste.

*Example III*

An aliquot of the stock solution of phenobarbital sodium of Example I containing 0.0235 molecular weights of the compound was reacted similarly with a chemically equivalent amount of a 10% aqueous-alcohol solution of a commercial grade of alkyl isoquinolinium bromide (Onyx Chemical Corporation's "Isothan Q-75" in which the alkyl distribution is 50% $C_{12}$, 30% $C_{14}$, 17% $C_{16}$, 3% $C_{18}$). The alcohol was removed by evaporation and the residual mixture was transferred to a separatory funnel along with a little benzene, whereupon it separated into two phases. The organic product layer was removed and dried in vacuo. Alkyl isoquinolinium 5 ethyl-5 phenylbarbiturate was recovered in 87% of the theoretical yield as a red-brown paste.

*Example IV*

A 10% solution was prepared of barbital sodium (the sodium salt of 5,5-diethylbarbituric acid). An aliquot of this solution containing 0.029 molecular weights of the compound was reacted with a chemically equivalent amount of the alkyl dimethyl ethyl-benzyl ammonium chloride of Example I and in the same manner. The organic product layer was removed and vacuum dried, yielding 84% of the theoretical amount of alkyl dimethyl ethyl-benzyl ammonium 5,5 diethylbarbiturate as a white solid.

*Example V*

An aliquot of the stock solution of barbital sodium of Example IV was reacted with a chemically equivalent amount of the alkyl dimethyl benzyl ammonium chloride of Example II and in the same manner. The dried product, alkyl dimethyl benzyl ammonium 5,5 diethylbarbiturate, was recovered as a light yellow paste in 92% of the theoretical yield.

*Example VI*

An aliquot of the stock solution of barbital sodium of Example IV was reacted with a chemically equivalent amount of the alkyl isoquinolinium bromide of Example III and in the same manner. The organic product layer was removed and vacuum dried to yield 76% of the theoretical of alkyl isoquinolinium 5,5 diethylbarbiturate as a reddish brown paste.

*Example VII*

When tested by the Standard Tube Dilution Method described above, these products gave the following values for static dilution (S.a.=*Staphylococcus aureus*; S.t.= *Salmonella typhosa*; A.n.=*Aspergillus niger*):

| Product of Example | Reciprocal of Static Dilution vs: | | |
|---|---|---|---|
| | S.a. | S.t. | A.n. |
| I | $10^5$ | $10^5$ | $10^4$ |
| II | $10^6$ | $10^6$ | $>10^6$ |
| III | $10^5$ | $10^5$ | $10^4$ |
| IV | $10^6$ | $10^6$ | $10^5$ |
| V | $10^6$ | $10^6$ | $10^6$ |
| VI | $10^6$ | $10^6$ | $10^4$ |

We claim:

1. A quaternary ammonium enolate of a cyclic derivative of a urea and an aliphatic acid selected from the group consisting of dicarboxylic, hydroxycarboxylic, aldocarboxylic and ketocarboxylic acids, having the following structure:

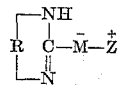

wherein Z is the cation of a quaternary ammonium compound having a single nitrogen atom and a phenol coefficient of at least 100 with respect to both *Staphylococcus aureus* and *Salmonella typhosa* at 20° C., and having an alkyl group of from 8 to 22 carbon atoms attached to the quaternary ammonium nitrogen atom; M is a member of the group consisting of oxygen and sulfur, and R is the residue of the said dicarboxylic, hydroxy-, aldo- or ketocarboxylic acid, said cyclic derivative being a member of the group consisting of parabanic acid, barbituric acid, diethylbarbituric acid, ethylphenylbarbituric acid, dialuric acid, uric acid, alloxan, acetylacetoneurea, uracil, thiouracil, xanthine and hydantoin.

2. Alkyl dimethyl ethyl-benzyl ammonium 5 ethyl-5 phenylbarbiturate.

3. Alkyl dimethyl benzyl ammonium 5 ethyl-5 phenylbarbiturate.

4. Alkyl isoquinolinium 5 ethyl-5 phenylbarbiturate.

5. Alkyl dimethyl ethyl-benzyl ammonium 5,5 diethylbarbiturate.

6. Alkyl dimethyl benzyl ammonium 5,5 diethylbarbiturate.

7. Alkyl isoquinolinium 5,5 diethylbarbiturate.

References Cited by the Examiner

UNITED STATES PATENTS

| 2,538,322 | 1/1951 | Opie et al. | 260—258 |
| 2,678,313 | 5/1954 | Schnider | 260—258 |
| 2,786,841 | 3/1957 | Cain | 260—258 |
| 2,946,797 | 7/1960 | Rudner | 260—286 |
| 2,957,866 | 10/1960 | Rudner | 260—236 |
| 2,970,999 | 2/1961 | Rudner | 260—270 |

FOREIGN PATENTS 1,134,679   8/1962   Germany.

OTHER REFERENCES

Schwartz et al.: Surface Active Agents and Detergents, vol. II, Interscience Publishers, Inc., New York, 1958, pages 210–222.

ALEX MAZEL, *Primary Examiner.*

HENRY R. JILES, *Examiner.*

MARY U. O'BRIEN, *Assistant Examiner.*